March 18, 1924.
J. W. HUDSON
HARROW ATTACHMENT
Filed July 23, 1923
1,487,386
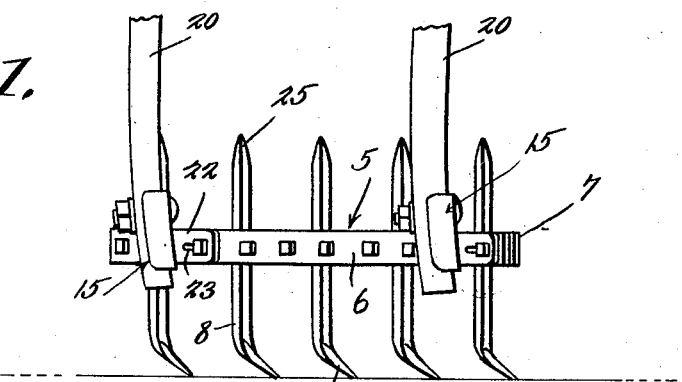
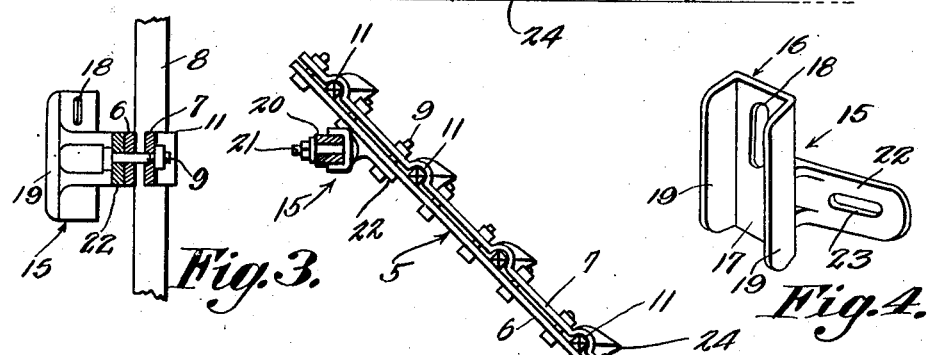
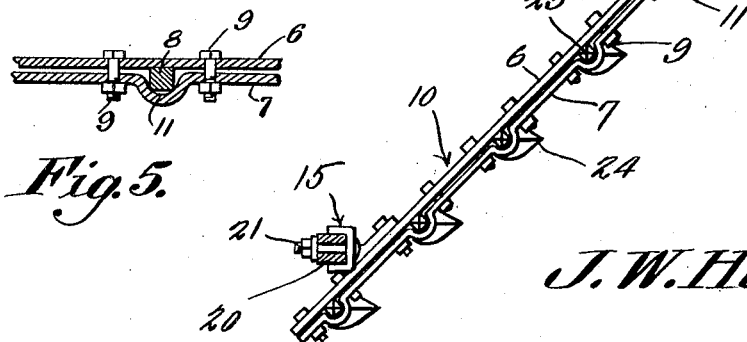
J. W. Hudson
Inventor.

Patented Mar. 18, 1924.

1,487,386

UNITED STATES PATENT OFFICE.

JOHNSTON W. HUDSON, OF HUMBOLDT, TENNESSEE.

HARROW ATTACHMENT.

Application filed July 23, 1923. Serial No. 653,249.

*To all whom it may concern:*

Be it known that I, JOHNSTON W. HUDSON, a citizen of the United States, residing at Humboldt, in the county of Gibson and State of Tennessee, have invented a new and useful Harrow Attachment, of which the following is a specification.

This invention relates to agricultural implements and more particularly to a side harrow attachment for use on cultivators.

The object of the invention is to provide an attachment of this character especially adapted to the cultivation of corn, cotton, beans, and other similar plants so constructed that it may be made to fit both sides of a ridge either high or low, and can also be lowered at the inside points to work on level land.

Another object is to so construct an attachment of this character so that the teeth or shovels may be held in position and the proper alinement thereof insured at all times.

Another object is to provide such an attachment having reversible teeth to adapt the device for use on either wet or dry land.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

In the accompanying drawings:—

Figure 1 represents a side elevation of the attachment constituting this invention shown applied.

Fig. 2 is a plan view of the attachment shown applied with the supports on which it is mounted shown in horizontal section.

Fig. 3 is a detail sectional view of the means for connecting the device to a support.

Fig. 4 is a detail perspective view of one of the connectors for uniting the attachment to a support; and Fig. 5 is a detail horizontal section showing the means for mounting one of the teeth or shovels.

In the embodiment illustrated the attachment constituting this invention comprises two gang frames 5 and 10 which are exactly alike in construction each composed of two parallel bars 6 and 7 between which are designed to be clamped the teeth or shovels 8 any desired number of which may be employed five being here shown carried by each frame. The bars 6 and 7 are secured together by bolts 9 and the outer bar 7 is equipped with a plurality of recesses or sockets 11 to receive the teeth 8 and hold them in proper alinement.

The frames 5 and 10 are equipped with four attaching devices 15, two right and two left, that are bolted to the frame and to the cultivator shovel shanks 20. One of the attaching devices 15 is shown in detail in Fig. 4 and comprises a shank engaging member 16 in the form of a plate 17 having a longitudinally extending slot 18 at one end and with right angular side flanges 19 extending in the same direction and which are designed to straddle a cultivator shovel shank 20 and be secured thereto by means of a bolt 21 extending through the slot 18 on the shank, said shanks being of the ordinary slotted type. Extending laterally from the outer face of the plate 17 is an arm 22 having a longitudinal slot 23 therein which is designed to rest against the outer face of bar 6 and be secured by one of the bolts 9 which connects bars 6 and 7. The arm 22 is arranged at an oblique angle to the member 16 as is shown clearly in Fig. 2 and the slot 23 therein provides for its adjustment relatively to the shovel carrying gang frame with which it is connected.

This method of applying the attachment to a cultivator permits of the use of the spring pin or trip which is on all cultivator shovel shanks, and not herein shown thereby relieving the strain on the side harrow attachment and the cultivator in connection with which it is used when an obstruction is struck. This connection also permits the operator to continue harrowing, the attachment being automatically released from any obstruction encountered.

By the use of the four attaching devices shown proper adjustment is provided to adapt the attachment to fit both sides of a ridge, either high or low and adapts it to be lowered at the inside points to work on level land.

The teeth or shovels 8 are preferably constructed with a duck foot 24 on one end and with a sharp point 25 on the other end so that the teeth may be reversed for use on wet or dry land.

Various changes in the form, shape, proportion and other minor details of construction may be made without departing from the principle or sacrificing any of the advantages of the claimed invention.

I claim:—

1. In a side harrow and cultivator attachment including two gang frame bars, connectors carried by said bars for uniting said bars to the shanks of a cultivator, said connectors each comprising a longitudinally slotted shank engaging plate having side flanges with an arm extending at an oblique angle from said plate and longitudinally slotted for adjustable connection with said gang frame bars.

2. A connector for uniting a gang frame to a supporting standard comprising a plate having a longitudinally extending slot therein and provided with right angularly extending side flanges adapted to straddle the standard to be engaged, and a longitudinally slotted arm extending at an angle from said plate for connection with the gang to be supported.

In testimony that I claim the foregoing as my own, I have hereto affixed my signature in the presence of two witnesses.

JOHNSTON W. HUDSON.

Witnesses:
R. W. JAMES,
Q. J. EDMONDS.